Dec. 29, 1936.                R. JARRIER                2,065,527
                AUTOMATIC SACKING AND WEIGHING MACHINE
                Original Filed July 25, 1929    2 Sheets-Sheet 1

René JARRIER
INVENTOR;
By [signature]
his Attorney.

Dec. 29, 1936.  R. JARRIER  2,065,527
AUTOMATIC SACKING AND WEIGHING MACHINE
Original Filed July 25, 1929   2 Sheets-Sheet 2

René Jarrier
INVENTOR;
By *[signature]*
his Attorney.

Patented Dec. 29, 1936

2,065,527

UNITED STATES PATENT OFFICE 2,065,527

AUTOMATIC SACKING AND WEIGHING MACHINE

René Jarrier, St.-Quentin, France, assignor to Bartlett Arkell, New York, N. Y.

Application July 25, 1929, Serial No. 380,832. Renewed May 4, 1932. In France August 2, 1928

8 Claims. (Cl. 249—62)

My invention relates to improvements in automatic sacking and weighing machines, in particular in sacking and weighing machines for valve-bags and more specifically in this type of machine which forms the subject matter of my pending application No. 274,329 filed on May 1st 1928.

The machine described in my aforesaid application comprises a loading hopper, a discharging tube extending from the bottom of said hopper and adapted to enter the valve of a valve bag, a worm conveyor rotatably mounted within said tube and extending at the lower part of the hopper, a weigh bridge of the usual type having its beam operatively connected with the power means adapted to actuate said worm, in such a manner that the worm will be automatically stopped when the bag has been filled of a given weight of material. A truck adapted to be pushed upon the weigh bridge and to support the bag is associated with the machine. Due to the fact that the valve bag directly engages the discharge tube, a pull may occur on said tube when the bag is swelling out while being filled, whereby the accuracy of the weighing operation will be greatly disturbed.

One object of the invention is to improve the accuracy of the machine and therefore to provide for the free swelling out of the bag without resulting in a pull on a part of the machine which is stationary with respect to the platform of the weigh-bridge. Another object is to facilitate the handling of the bag when filled and its removal from the machine.

The sacking and weighing machine improved according to the invention comprises a shell surrounding the discharge tube extending from the machine and supported independently of said tube by a rigid bracket carried by the platform of the weigh-bridge. A small space is vertically provided between the discharge tube and the surrounding shell to accommodate the small up and down displacements of the weigh-bridge platform.

Further objects and features of the invention will be specified in the following description and more fully pointed out in the claims.

In the appended drawings given solely by way of example,

Fig. 3 is a detail view on a larger scale showing the automatic control of the closing door by the switch of the motor circuit.

Fig. 4 is a perspective view of the loading hopper and the closing door, with parts broken away showing the said stirring device.

Fig. 6 is a diagrammatic perspective view showing a preferred embodiment of the swinging switch.

Figure 1:
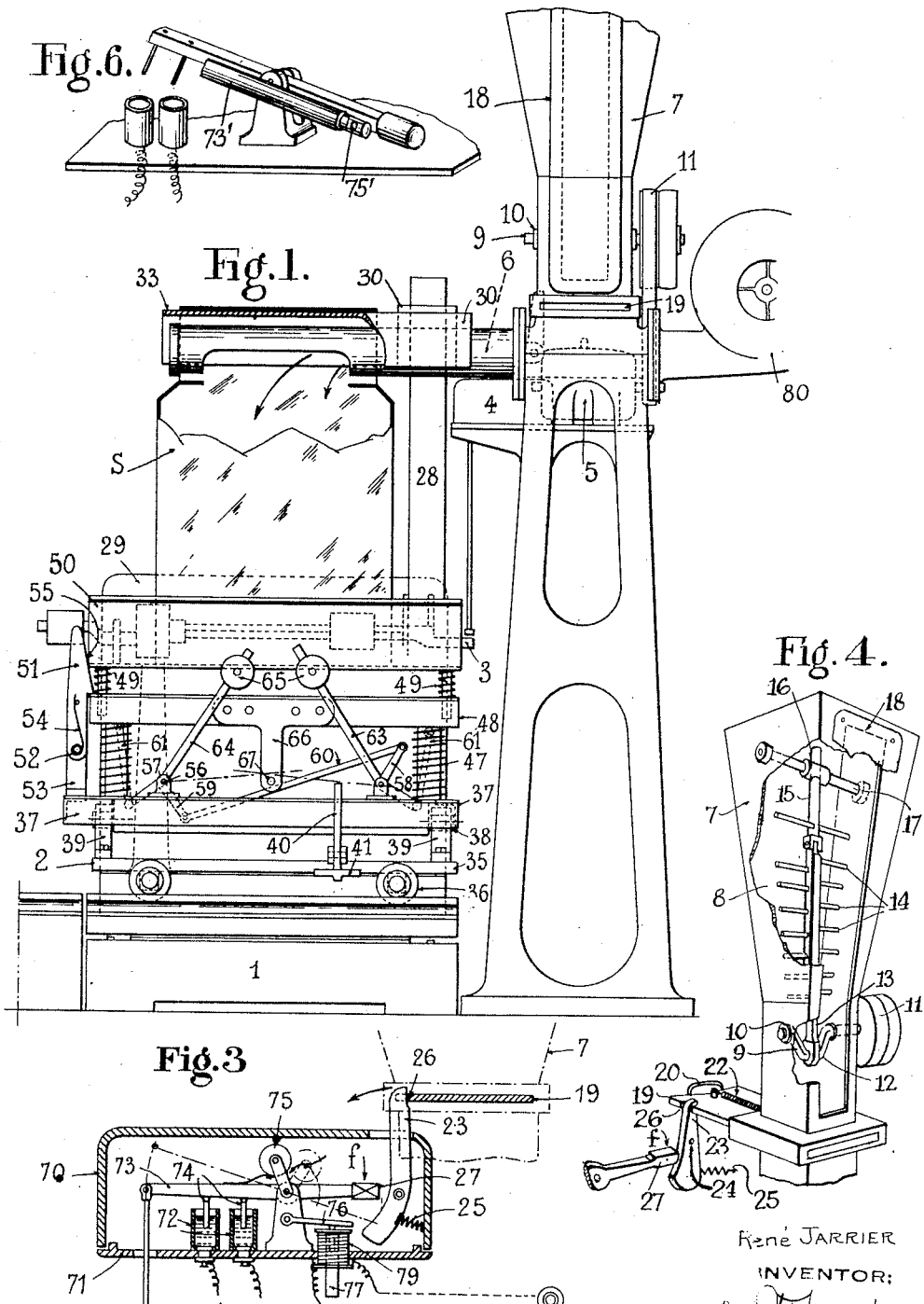
Fig. 1 is a general elevational view of the machine with the sack in the filling position.

The apparatus essentially comprises a weighing bridge 1, in current use, upon which is mounted a roller truck 2 having a tipping platform and carrying a sack S; a scale beam 3 automatically controls a switch 4 mounted in the circuit of a motor 5 driving the conveyor 6 of the sacking machine, which conveyor draws forward the material descending from a loading hopper 7.

According to the present invention, a stirring device 8 is disposed in said hopper 7 to facilitate the descent of the material and to prevent it from clogging, and said device may comprise a crankshaft 9 rotatably mounted in bearings or stuffing boxes 10 mounted on the hopper. The outer end of the shaft carries a pulley 11 or the like, by which it may be driven from a power device. Upon a central crank pin is mounted a link 13 carrying upon its whole length suitable staggered rods 14 which may be provided with teeth after the manner of a comb. The said link is pivoted at the end to a rod 15 which is axially guided in the hopper by a sleeve 16 which is supported by arms 17 secured to the wall. The hopper is provided with a lateral inspection door consisting of a removable plate 18 extending upon its whole height and secured in any suitable manner.

The operation is as follows. The moving rods stir up the material, thus preventing it from clogging, and it thus descends regularly.

The lower end of the hopper may be closed by a sliding door 19 provided with a handle 20 (Fig. 4) for hand control; the door is urged into the closing position by a spring 22, and it is held in the open position by an arm 23 pivoted at 24 and urged by a spring 25, under whose action the arm is inserted into a notch 26 in the side of door. The said arm is also in the path of a plate 27 controlled by the plate 73 hereinafter described. When the said switch is opened, the plate which is enabled to pivot in the direction of the arrow f (Figs. 3 and 4) makes contact with the lower part of the arm 23 and turns it against the action of the spring 25, and the said arm is thus removed from the notch 26, so that the said door will be actuated by its spring 22 and will be thus closed, and the material can no longer descend.

Figure 2:
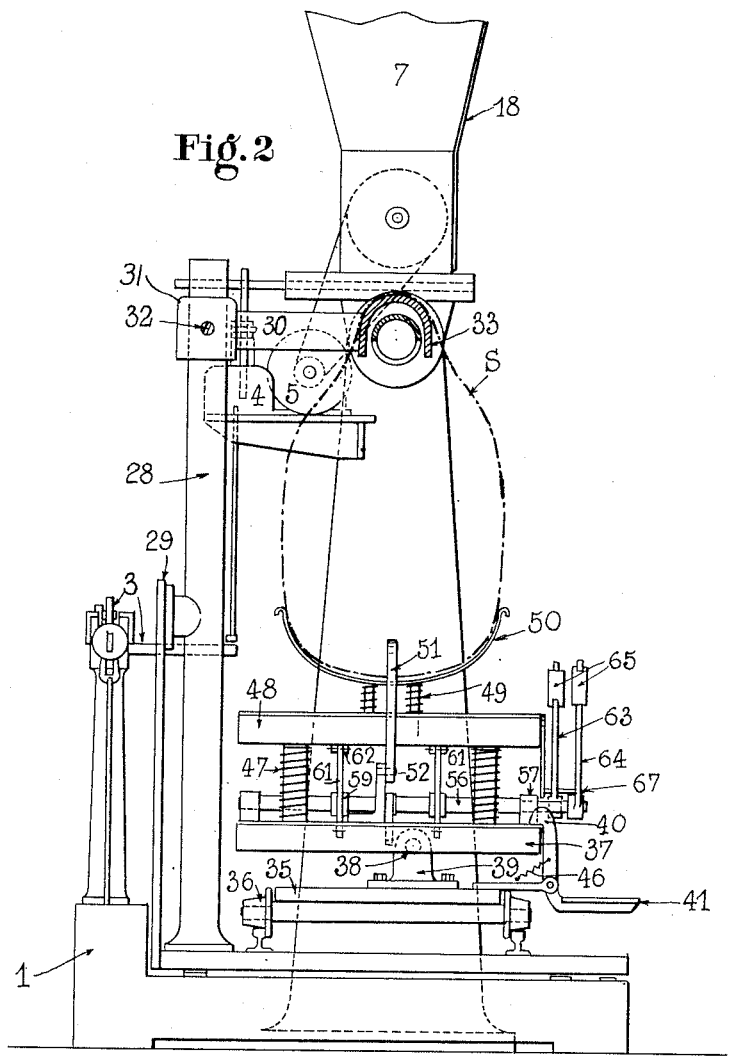
Fig. 2 is a corresponding end view.

Figs. 1 and 2 show a device which prevents any part of the weight of the sack from resting upon the sacking tube instead of upon the scale platform; the machine is provided with a support comprising a stationary upright 28 which is secured on the one hand to the said scale platform and on the other hand to the back member 29. Upon the said upright is slidable a sleeve 31 carrying a horizontal arm 30, said sleeve being held in any position by the set screws 32. A semi-cylindrical member 33 is disposed on the said arm 30, it being perpendicularly mounted on the end of said arm and in the horizontal position; its internal diameter exceeds the external diameter of the sacking tube which it covers at the top. The sack S, which may have oppositely disposed valve openings is not disposed directly upon the sacking tube but is mounted on the said covering member 33; the whole weight of the sack is thus brought upon the scale platform.

Figs. 1 and 2 show an improved tipping truck, and herein the truck comprises a stationary platform 35 provided with wheels 36. A second platform 37 is mounted on an axle 38 rotatable in supports 39 which are disposed upon the platform 35; and said platform is held in the horizontal position by a hook 40 secured to a pedal 41 and pivoted to the platform 35. A spring 46 urges the said hook into the vertical position in which it maintains the platform 37. This latter is provided with a plurality of springs 47 adapted to support a large plate 48; suitable springs 49 mounted on said plate serve to support the platform 50 upon which the sack is directly supported while it is being filled. When the springs 47 are compressed, the plate 48 is engaged below a hook 51 rotatable on an axle 52 mounted on a support 53 secured to the platform 37. A spring 54 constantly maintains the hook 51 in the vertical position, and on the upper part of said hook is formed a ramp 55 situated in the path of any suitable part of the platform 50 during the compression of the springs 49. The springs 47 are compressed by the following device. Axles 56 are rotatable in bearings 57 mounted on the platform 37, and to the said axles are keyed the respective bell-cranks 58—59. The said bell-cranks are connected together at one end by a coupling bar 60; their other ends are pivoted to the respective links 61 each of which is pivoted in a forked bracket 62 mounted below the platform 48. To the ends of the axles 56 which extend outwardly of the platform are keyed the respective levers 63—64, upon each of which is slidable a counterweight 65 which can be set in any desired position. A member 66 secured to the plate 48 carries a stop 67 adapted for contact with the levers 63—64. Due to the weight of the said counterweights 65 and of the other parts situated on the side of the platform 37, the latter will be brought into the horizontal position when it carries no weight.

The operation is as follows. During the loading operation, the sack rests upon the platform 50, and at the beginning of this operation the plate 48 is brought into the lower position, by raising the levers 63—64, thus compressing the springs 47; the said plate is held in this position by the hook 51. The springs 49, which are of such construction as to support a determined weight, for instance 15-20 kgs., will be gradually compressed, and when the platform thus descends, its edge bears against the said ramp 55 of the hook 51, so that the latter is released and the plate 48 is abruptly raised under the combined action of the springs 47 and the counterweights 65. The levers 63—64 make contact with the stop 67, thus limiting the stroke of the plate. Under the effect of this impact, the material already contained in the sack will settle down by its inertia, so that the sack will open out, thus facilitating the subsequent feeding of the material, and it is not required to press upon the sides of the sack in order to open them.

When the sack has been loaded, the operator presses the pedal 41 so as to release the hook 40 and disengage the platform 37, which then becomes inclined due to the weight of the sack which has the overhung position. The sack will thus be discharged by its own weight; the weight of the counterweight 65 and the other parts on this side will then bring back the platform after the sack has been discharged, and it will again engage below the hook 40 which is returned by its spring 46.

Fig. 3 shows the control of the automatic switch, which comprises a case 70, a base 71 carrying mercury cups 72, a pivoting plate 73 provided with contact pins 74, and a counterweight 75 which is in unstable equilibrium when the said pins 74 are inserted into said mercury cups. The plate 73 has a depending rod connected with one end, the lower end of the rod being arranged adjacent the top side of the scale-beam 3. When the plate 73 is slightly raised, this overturns the said counterweight and it falls upon the said plate 73, so that the circuit will be abruptly broken. To close the circuit, the said plate is raised in the inverse direction, for instance by a lever 76, which is pivoted to a stationary support mounted on the base 71 and which is controlled by a core 77 of a solenoid 79 whose exciting circuit may be controlled by a push button of the usual electric bell type, disposed at any point of the machine and within reach of the operator. The plate 73 and the counterweight 75 may be advantageously made (Fig. 6) of a tube 73' closed at both ends and a ball 75' contained therein and adapted to run lengthwise of this tube.

Figure 5:
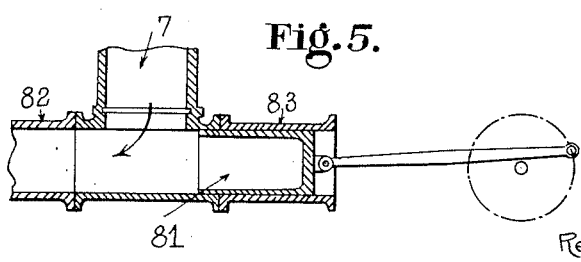
Fig. 5 shows a modification of the conveyor device.

It is further possible to employ various devices by which the material descending from the hopper will be delivered into the filling tube, and examples of such devices are shown in Figs. 1, 2 and 5. In the device shown in Figs. 1 and 2, the material is driven forward by a current of air. An air blower 80 is disposed at one side of the hopper, and the air is discharged directly into the filling tube, drawing with it the material which drops into the air channel.

In Fig. 5, the device comprises an impelling piston 81, which is given a reciprocating motion by suitable means; said piston is hollow and is slidable in two tubes 82 and 83, situated on the respective sides of the hopper, one of said tubes being succeeded by the filling tube. The length of the piston exceeds the diameter of the orifice of the hopper, so that the latter will be closed when the piston has completed its forward stroke.

Obviously, the present invention is not limited to the details of construction herein described and represented by way of example, and these are susceptible of various modifications without departing from the principle of the invention.

Having now described my invention what I claim as new and desire to secure by Letters Patent is:

1. A machine for the automatic filling and weighing of bags comprising in combination a weighing bridge, a bag support carried by said weighing bridge, an upright, a loading hopper on said upright, a discharging tube projecting from the bottom of said hopper and in communication with the interior thereof and adapted to enter a bag, means for conveying through said tube the material contained within the hopper, power means for actuating said conveying means, a sliding door adapted to close off the discharge conduit of said hopper, locking means for holding said door in the open position against the antagonistic thrust of resilient means, means responsive to the displacement of the scale beam for automatically stopping said conveying means, and means associated with said stopping means for releasing said locking means, whereby the sliding door will shut off the communication between the hopper and the inlet of the discharging tube.

2. In a bag filling and weighing machine, the combination of a weighing device comprising a weighing platform, an auxiliary platform supported on the weighing platform, and means acting automatically for raising the auxiliary platform after the completion of the weighing and before removing the filled bag.

3. In a bag filling and weighing machine, the combination of a weighing device comprising a weighing platform, an auxiliary platform, a bag filling tube positioned above the auxiliary platform, and means acting automatically for raising the auxiliary platform after the completion of the filling of the bag and before removing the filled bag.

4. In a bag filling and weighing machine, the combination of a weighing device comprising a scale platform, an auxiliary platform mounted on said scale platform, means for holding said auxiliary platform in fixed position with relation to said main platform during the filling and weighing operation, means for releasing said holding means after the completion of the weighing operation, and means acting automatically to raise said auxiliary platform when said holding means is released.

5. In a bag filling and weighing machine of the class described, the combination of a filling tube, a weighing device comprising a weighing platform, an auxiliary platform positioned above the weighing platform, and means acting automatically at the completion of the weighing operation for moving the auxiliary platform upwardly.

6. In a bag filling and weighing machine of the class described, the combination of a filling tube, a weighing platform, an auxiliary platform mounted on the weighing platform, means comprising springs tending to force said auxiliary platform upwardly with relation to the weighing platform, means for lowering the auxiliary platform against the tension of said springs to a predetermined position with relation to the weighing platform, means for holding the auxiliary platform in said lowered position, and means acting automatically when a predetermined weight of material has been deposited in the bag for releasing said holding means to permit said springs to move the auxiliary platform upwardly.

7. In a bag filling and weighing machine of the class described, the combination of a hopper, a bag filling tube leading from the hopper, means for feeding material from the hopper through the filling tube, a device for opening and closing communication between said hopper and said feeding means, a device for holding said closing device in open position during the filling and weighing operation, electrically operated means for releasing said holding device at the completion of the weighing, and means acting automatically when said holding device is released for moving said closing device into closed position.

8. In a bag filling and weighing machine of the class described, a bag filling tube, a weighing platform, and means acting automatically at the completion of the filling and weighing operation for moving the bag upwardly with relation to the filling tube.

RENÉ JARRIER.